US012745875B2

(12) United States Patent
Zhang et al.

(10) Patent No.: US 12,745,875 B2
(45) Date of Patent: Sep. 29, 2026

(54) MULTIFUNCTIONAL AIR FRYER

(71) Applicant: NINGBO CARELINE ELECTRIC APPLIANCE CO., LTD., Ningbo (CN)

(72) Inventors: Yichi Zhang, Ningbo (CN); Huayuan Pan, Ningbo (CN); Rongjie Bai, Ningbo (CN); Jiahe Liang, Ningbo (CN)

(73) Assignee: NINGBO CARELINE ELECTRIC APPLIANCE CO., LTD., Ningbo (CN)

( * ) Notice: Subject to any disclaimer, the term of this patent is extended or adjusted under 35 U.S.C. 154(b) by 899 days.

(21) Appl. No.: 18/096,259

(22) Filed: Jan. 12, 2023

(65) Prior Publication Data

US 2023/0225553 A1 Jul. 20, 2023

(30) Foreign Application Priority Data

Jan. 20, 2022 (CN) ......................... 202210063317.4

(51) Int. Cl.
*A47J 37/06* (2006.01)

(52) U.S. Cl.
CPC ....... *A47J 37/0641* (2013.01); *A47J 37/0664* (2013.01)

(58) Field of Classification Search
CPC .......................... A47J 37/0611; A47J 37/0641
See application file for complete search history.

(56) References Cited

U.S. PATENT DOCUMENTS

| | | | | |
|---|---|---|---|---|
| 2018/0035698 | A1* | 2/2018 | McNerney | A23L 5/17 |
| 2020/0191404 | A1* | 6/2020 | Song | F24C 7/088 |
| 2022/0313016 | A1* | 10/2022 | Chow | A47J 37/128 |
| 2022/0395137 | A1* | 12/2022 | Wang | A47J 37/0641 |
| 2023/0329480 | A1* | 10/2023 | Zhong | A47J 36/32 |

* cited by examiner

*Primary Examiner* — Rodolphe Andre Chabreyrie
(74) *Attorney, Agent, or Firm* — Hogan Lovells Cadwalader US LLP

(57) ABSTRACT

Provided is a flip-type multifunctional air fryer, including a cookware, a head, a base and a side plate provided between the head and the base, wherein a bottom of the head has an open structure, an air frying module is mounted in the head, the cookware at least includes a basket, the head is rotatably connected with the side plate, and the head at least has two positions in a rotation process: a first position where a bottom opening of the head faces downwards and is communicated with a top opening of the basket; a second position where the bottom opening of the head faces upwards and is connected with a bottom of the cookware.

18 Claims, 6 Drawing Sheets

MULTIFUNCTIONAL AIR FRYER

TECHNICAL FIELD

The present application relates to the field of kitchen appliance technologies, and particularly to a flip-type multifunctional air fryer.

BACKGROUND ART

An air fryer is a small appliance for cooking by utilizing a high-speed air circulation technology, and in a prior art, the air fryer includes a drawer-type air fryer and a flip-type air fryer, wherein the drawer-type air fryer is generally provided with a cavity with an opening, and a basket can be placed into the cavity through the opening; the flip-type air fryer includes a fryer body and a cover rotatably connected with the fryer body, and when the cover is opened, the basket can be placed into the fryer body.

However, the existing air fryer has limited functions, and although some air fryers have the functions of frying, decocting, roasting, steaming, or the like, by providing bottom heating module, the air fryers with such a structure have higher costs.

SUMMARY

The present application provides a flip-type multifunctional air fryer to solve a problem that an existing multifunctional air fryer has a high cost.

In order to solve the above-mentioned technical problem, the present application provides a flip-type multifunctional air fryer, including: a cookware, a head, a base and a side plate provided between the head and the base, wherein a bottom of the head has an open structure, an air frying module is mounted in the head, the cookware at least includes a basket, the head is rotatably connected with the side plate, and the head at least has two following positions in a rotation process:

a first position where a bottom opening of the head faces downwards and is communicated with a top opening of the cookware; and a second position where the bottom opening of the head faces upwards and is connected with a bottom of the cookware.

In an optional embodiment, a handle is provided on the head, and the handle supports the head when the head is rotated to the second position. In the present application, the head can be supported and rotated by the handle, and therefore, no additional structure is required to be provided to support the head, thus simplifying a structure of the air fryer and saving a production and manufacturing cost.

In an optional embodiment, the handle is hinged to the head, and when the head is rotated to the first position, the handle is accommodated on a surface of the head; when the head is rotated to the second position, the handle supports the head. In the present embodiment, the handle is hinged to the head, such that the handle can be attached to the surface of the head, thus reducing an accommodating space for the air fryer, and meanwhile improving aesthetics of the air fryer.

In an optional embodiment, the head is provided with a hinged shaft and a limiting groove, the handle is provided with a long strip hole, the hinged shaft is in sliding fit with the long strip hole, and the hinged shaft has a locking position and an unlocking position in the long strip hole; when the head is supported by the handle, the hinged shaft is in the locking position, and the handle is limited in the limiting groove. In the present embodiment, the handle can be fixed by the design of the limiting groove, thus preventing the handle from shaking.

In an optional embodiment, a hinged seat is provided between the head and the side plate, a first mounting hole is provided in one of the head and the hinged seat, a corresponding first pin shaft is provided in the other of the head and the hinged seat' a second mounting hole is provided in one of the side plate and the hinged seat, a corresponding second pin shaft is provided in the other of the side plate and the hinged seat; the first pin shaft is fitted with the first mounting hole, and the second pin shaft is fitted with the second mounting hole, so as to hinge the head to the side plate. In the present embodiment, the arrangement of a double-shaft hinged structure may reduce a rotating speed of the head, avoid impact of the head in a rotating process on the whole machine and a structure at a hinged position, and guarantee stability and use reliability of the whole machine. Meanwhile, when the head is rotated to the second position, the double-shaft hinged structure can also assist in supporting the head, so as to improve stability of the head.

In an optional embodiment, a heating element is mounted in the base, wherein the heating element includes one of a coil disk, a heating pipe and a heating disk, and the heating element is provided corresponding to the bottom of the cookware. In the present embodiment, working modes of the air fryer are further expanded by providing the heating element, thus improving a cooking efficiency of the air fryer.

In an optional embodiment, a first groove is provided in the base, and at least part of the cookware is limited in the first groove. In the present embodiment, the arrangement of the first groove can avoid shaking or shifting of the cookware when placed on the base.

In an optional embodiment, the head is provided with a second groove, and when the head is rotated to the second position, at least part of the cookware is limited in the second groove. The arrangement of the second groove can avoid shaking or shifting of the cookware when placed on the opening of the head.

In an optional embodiment, a third groove is provided in a periphery of the second groove, and when at least part of the cookware is limited in the second groove, a safety region is formed between the third groove and the cookware, thus preventing the air frying module from scalding a user. The arrangement of the third groove can prevent a scalding event when the cookware at the opening of the head is taken and placed.

In an optional embodiment, a junction box is provided on a side surface of the side plate. In the present embodiment, the arrangement of the junction box facilitates accommodation of a power line, thus preventing the power line from being lost or damaged, and also improving the aesthetics of the air fryer.

In an optional embodiment, the junction box has a support portion, and when the head is rotated to the second position, the support portion supports the head; and/or the junction box is slidably connected with the side surface of the side plate, and when the head is rotated to the second position, the junction box slides to the third position, and the junction box supports the head. In the present application, by providing the support portion or sliding the junction box to the third position, the junction box is attached to the head, and the junction box assists in supporting the head, thus reducing a force at a position where the head and the side plate are hinged, and prolonging service life of the air fryer.

In an optional embodiment, the air fryer further includes:

a water tank;

a water pump communicated with the water tank;

a steam generator provided in the base and having a water inlet and a steam outlet, wherein the water inlet of the steam generator is communicated with the water pump, and the steam outlet of the steam generator is communicated with an interior of the cookware. In the present application, by providing the water tank, the water pump and the steam generator, the air fryer has steaming and stewing functions, and steaming and roasting may be combined in a cooking process, thus improving a taste of food.

In an optional embodiment, the basket includes a base plate and a vertical plate provided around the base plate, the base plate and the vertical plate are integrally shaped to form an accommodating cavity, and when the basket is placed on the base, part of the vertical plate is surrounded by the side plate, and the rest area is directly exposed. In the present application, the vertical plate is directly exposed, such that heat of the basket may be dissipated using an external environment, thus reducing the manufacturing cost of the air fryer.

In an optional embodiment, the basket further includes a cover on the vertical plate for covering, an inner wall of the vertical plate is provided with a step surface, and a frying plate and a steaming plate are selectively mounted on the step surface. In the present application, food may be fried and steamed by the basket, and the basket has multiple functions, thus achieving good practicality.

In an optional embodiment, a detachable protective net is provided in the head, and the protective net is located below the air frying module. In the present embodiment, the arrangement of the protective net can prevent the oil fume from entering the interior of the head to pollute a heating tube, a heat circulation fan, or the like, or avoid direct contacting of the cookware and the heating tube which damages a coating of the cookware or generates a scratch.

Compared with the prior art, the present application has the following beneficial effects.

In the present application, the head is rotatably connected with the side plate, and when the head is rotated to the first position, the bottom opening of the head faces downwards, and the air frying module in the head and the basket form an air fryer which can be used for air frying of food; when the head is rotated to the second position, the bottom opening of the head faces upwards, the cookware is mounted on the opening of the head, and the air frying module is used to steam, stew, decoct and roast food. In the present application, cooking functions of the air fryer are expanded by a structural improvement, so that the air fryer has multiple functions without additionally providing other heating elements, and the purpose of using one air fryer to achieve multiple uses is realized, and the user can rotate the head and select the cookware according to cooking requirements, such that the air fryer better meets the cooking requirements of the user.

REFERENCE NUMERALS

Figure 1:
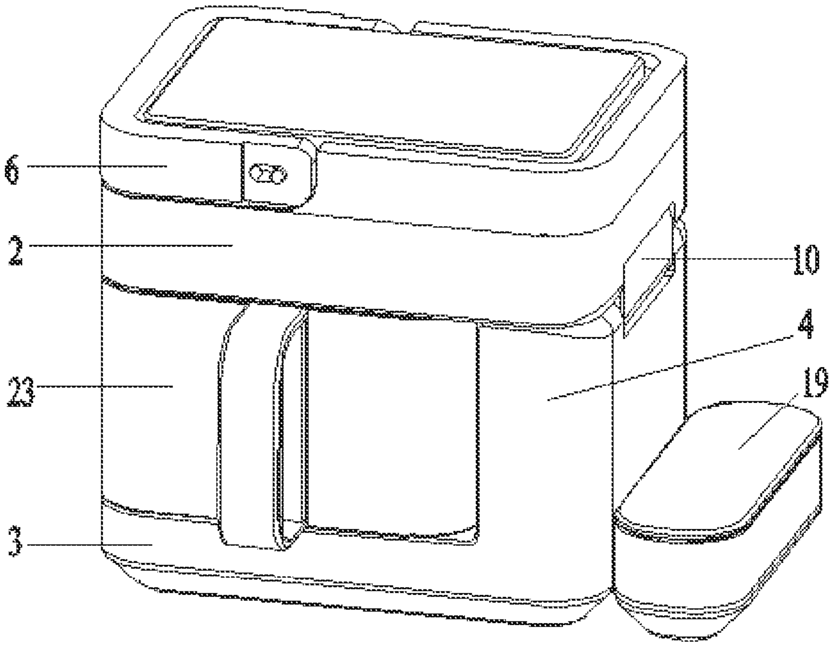
FIG. 1 is a schematic structural diagram of a flip-type multifunctional air fryer according to an embodiment of the present application in which a head is rotated to a first position.
Figure 2:
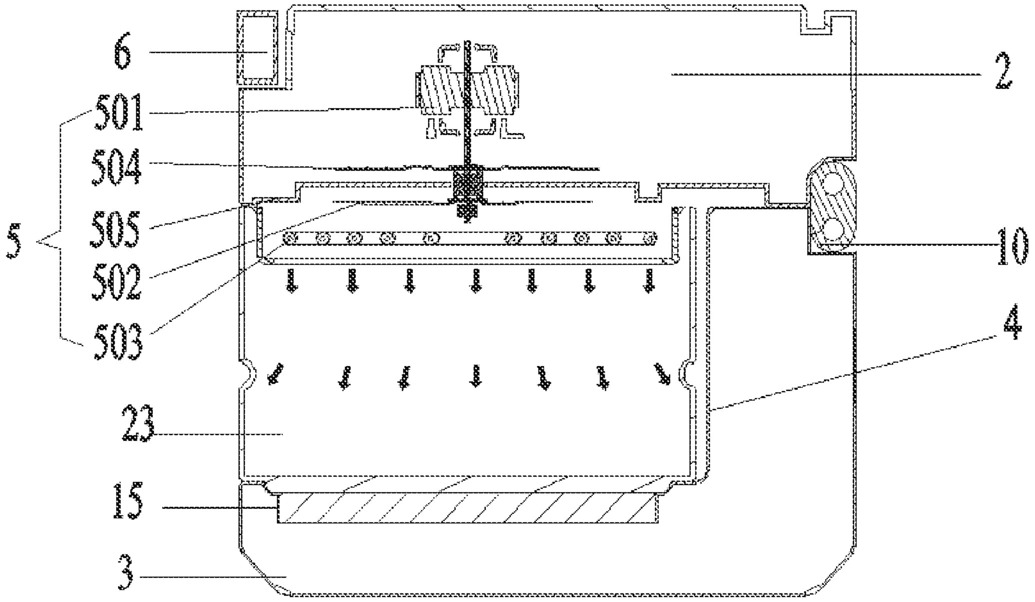
FIG. 2 is a sectional view of the flip-type multifunctional air fryer according to the embodiment of the present application in which the head is rotated to the first position.
Figure 3:
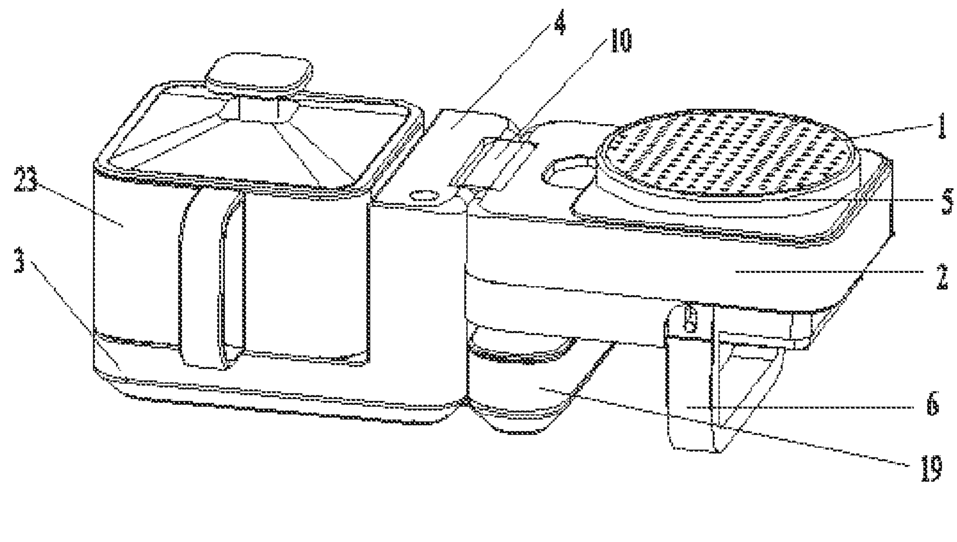
FIG. 3 is a schematic structural diagram of the flip-type multifunctional air fryer according to the embodiment of the present application in which the head is rotated to a second position.
Figure 4:
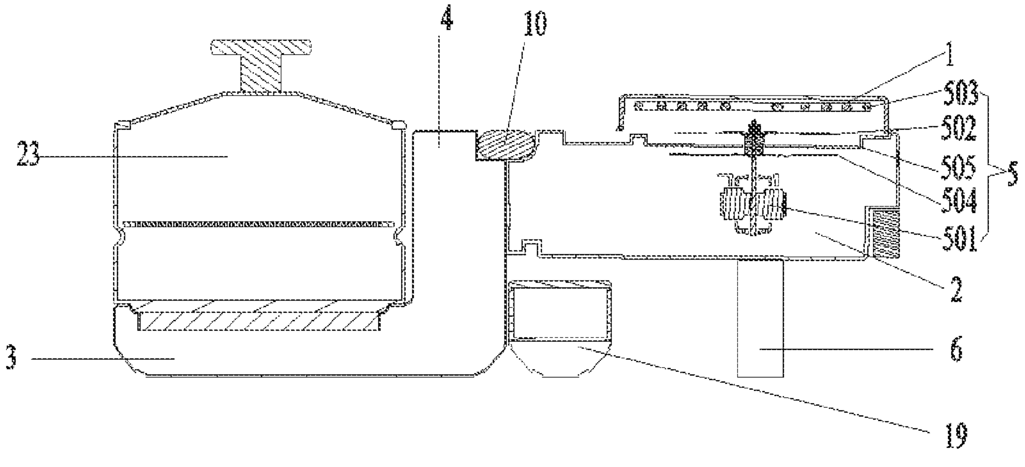
FIG. 4 is a sectional view of the flip-type multifunctional air fryer according to the embodiment of the present application in which the head is rotated to the second position.
Figure 5:
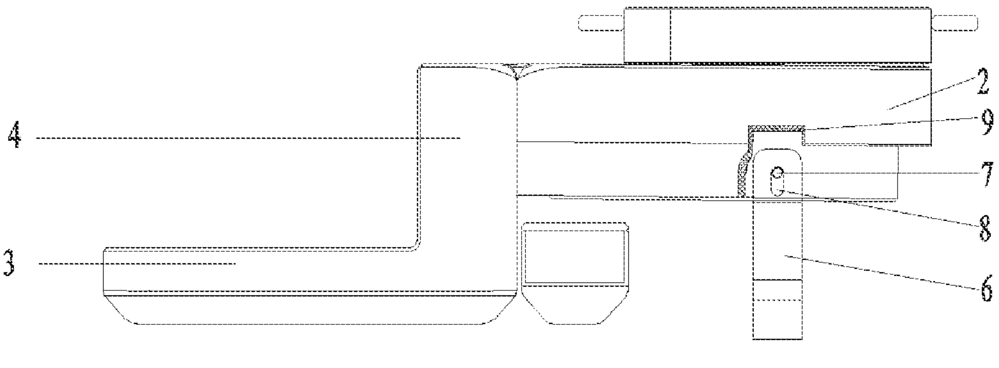
FIG. 5 is a sectional view of the embodiment of the present application in which the head is rotated to the second position and a handle is located at an unlocking position.
Figure 6:
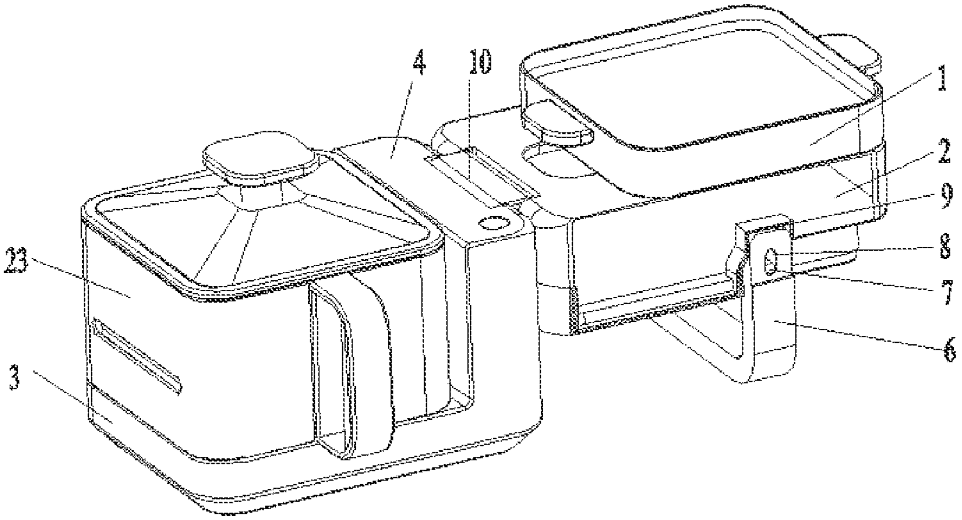
FIG. 6 is a schematic diagram of the embodiment of the present application in which the head is rotated to the second position and the handle is located at a locking position.
Figure 7:
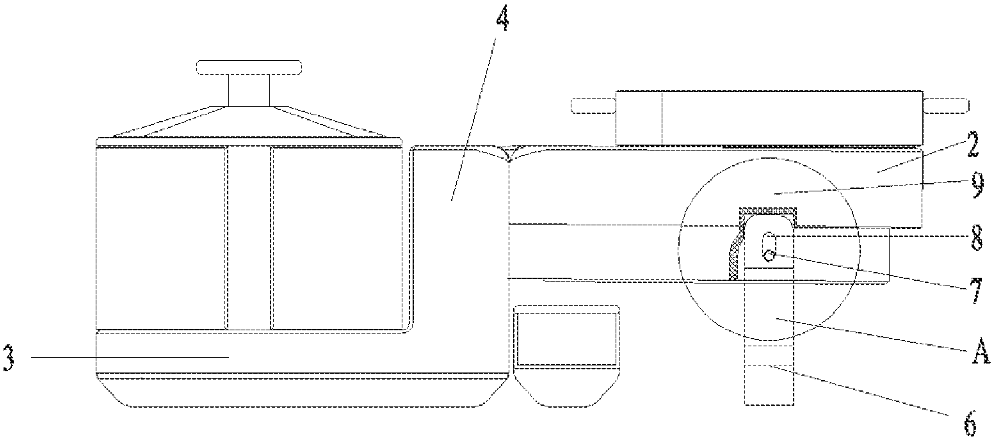
FIG. 7 is a sectional view of the embodiment of the present application in which the head is rotated to the second position and the handle is located at the locking position.
Figure 8:
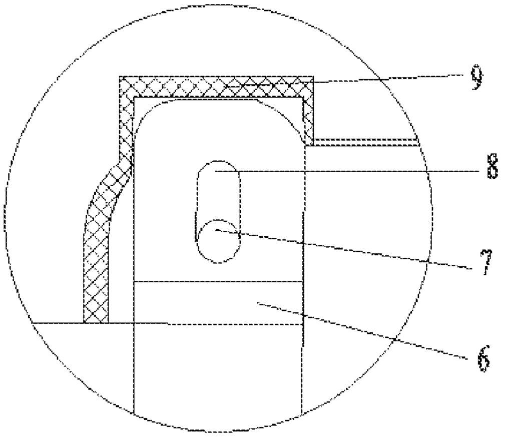
FIG. 8 is a partial enlarged view at A in FIG. 7.

1. cookware; 2. head; 3. base; 4. side plate; 5. air frying module; 501. motor; 502. heat circulation fan; 503. heating tube; 504. heat dissipation fan; 505. air duct plate; 6. handle; 601. support portion; 602. connecting portion; 7. hinged shaft; 8. long strip hole; 9. limiting groove; 10. hinged seat; 11. first mounting hole; 12. first pin shaft; 13. second mounting hole; 14. second pin shaft; 15. heating element; 16. first groove; 17. second groove; 18. third groove; 19. junction box; 20. water tank; 21. water pump; 22. steam generator; 23. basket; 24. base plate; 25. vertical plate; 26. cover; 27. step surface; 28. steam nozzle.

DETAILED DESCRIPTION

In order to make the aforementioned objects, features and advantages of the present application more apparent, the present application is described in further detail with reference to the accompanying drawings and the detailed description.

See FIGS. 1 to 4, which show a flip-type multifunctional air fryer, including: a cookware 1, a head 2, a base 3 and a side plate 4 provided between the head 2 and the base 3, wherein a bottom of the head 2 is of an open structure, an air frying module 5 is mounted in the head 2, the head 2, the base 3 and the side plate 4 form a cooking cavity, the cookware 1 can enter and exit the cooking cavity, the head 2 is rotatably connected with the side plate 4, and the head 2 at least has two positions as follows in a rotation process:

a first position where a bottom opening of the head 2 faces downwards and is communicated with a top opening of the cookware 1; a second position where the bottom opening of the head 2 faces upwards, and at least one of the bottom opening of the head 2 and the base 3 is connected with a bottom of the cookware 1.

Specifically, the air frying module 5 includes a motor 501, a heat circulation fan 502, a heating tube 503 and a temperature controller (not shown), an output shaft of the motor 501 is sleeved with the heat circulation fan 502, and the motor 501 drives the heat circulation fan 502 to work, so as to blow hot air generated by a heating pipe into the cookware 1. Certainly, in practical applications, in order to avoid the influence of the heat generated during rotation of the motor 501 on the surrounding electronic elements, an air inlet is usually provided on a top of the head 2, the motor 501 is sleeved with a heat dissipation fan 504, and the heat dissipation fan 504 sucks cold air from the air inlet to cool the motor 501. Furthermore, in order to avoid mutual influences between the cold air and the hot air, an air duct plate 505 is usually provided between the heat dissipation fan 504 and a cooling fan, and the air duct plate 505 is in a shape of a horn, which can on the one hand isolate the hot air to prevent it from flowing upwards, and on the other hand guide the hot air to flow towards the cookware 1. A number of the cookware 1 can be one or more, the cookware 1 includes one or more of a basket, a steaming pan, a stewing pan, a frying pan, a decocting pan and a roasting pan, and one of the cookwares 1 is the basket 23. When the head 2 is rotated to the first position, the basket 23 can be placed on the base 3, a top of the basket 23 is communicated with the air frying module 5, food is air fried, the basket 23, the head 2, the base 3 and the side plates 4 form an open structure at this point, and an opening of the cooking cavity would not be blocked by the basket 23; when the head 2 is rotated to the second position, the basket 23 is placed on the bottom opening of the head 2 to cook food. Certainly, at this point, a decocting plate can be placed on the bottom opening of the head 2 to decoct food, or a marmite can be placed to stew food.

In the present embodiment, the head 2 is rotatably connected with the side plate 4, the side plate 4 can be fixedly or movably connected with the base 3, and certainly, in order to guarantee stability of an overall performance of the air fryer, the base 3 is usually fixedly connected with the side plate 4, and the base 3 and the side plate 4 are in an L-shaped structure. A rotation range of the head 2 is 0-180°. When a rotation angle is 0°, the head 2 is in the first position, the head 2, the base 3 and the side plate 4 are in a transverse n shape, and at this point, food can be air fried using the motor 501, the heat dissipation fan 504, the heat circulation fan 502 and the heating tube 503; and when the rotation angle is 180°, the head 2 is in the second position, the opening of the head 2 is flush with a top end of the side plate 4, and at this point, food can be steamed, stewed, decocted and roasted by the heating tube 503. In the present application, cooking functions of the air fryer are expanded by a structural improvement, so that the air fryer 1 has multiple functions of frying, steaming, stewing, decocting, roasting, or the like, and the purpose of using one air fryer to achieve multiple functions is realized, and the user can rotate the head 2 and select the cookware 1 according to cooking requirements, such that the air fryer better meets the cooking requirements of the user.

In an optional embodiment, a handle 6 is provided on the head 2, and the handle 6 supports the head 2 when the head 2 is rotated to the second position. Specifically, during air frying of the food, the head can be turned over by the handle 6, so as to take and put the basket 23. When the food is steamed and stewed, after the head 2 is turned over by 180° by the handle 6, the head 2 is supported by the handle 6, and the head 2 is stably placed upside down on a working table, and a gap is formed between the head 2 and the working table, so as to dissipate heat in a cooking process. In the present embodiment, since the head 2 can be both supported and rotated by the handle 6, no additional structure is required to be provided to support the head 2, thus simplifying a structure of the air fryer and saving a production and manufacturing cost.

In an optional embodiment, with reference to FIGS. 5 to 8, when the head 2 is rotated to the first position, the handle 6 is accommodated on a surface of the head 2; and when the head 2 is rotated to the second position, the handle 6 supports the head 2. Specifically, the handle 6 includes a support portion 601 and two connecting portions 602, one end of each connecting portion 602 is hinged to the head 2, and the other end is fixedly connected with the support portion 601. A housing of the head 2 is provided with an accommodating groove. When the handle 6 is not used, the handle 6 naturally falls down and is hidden in the accommodating groove; and when the head 2 is rotated to the second position, the support portion 601 of the handle 6 is attached to the working table, and the connecting portion 602 is fixed to the head 2 by a fastener. In the present embodiment, the handle 6 is hinged to the head 2, such that the handle 6 can be attached to the surface of the head 2, thus reducing an accommodating space of the air fryer, and meanwhile improving aesthetics of the air fryer.

In an optional embodiment, referring to FIGS. 5 to 8, the head 2 is provided with a hinged shaft 7 and a limiting groove 9, the handle 6 is provided with a long strip hole 8, the hinged shaft 7 is in sliding fit with the long strip hole 8, and the hinged shaft 7 has a locking position and an unlocking position in the long strip hole 8; when the head 2 is supported by the handle 6, the hinged shaft 7 is located at the locking position, and the handle 6 is limited in the limiting groove 9. Specifically, each of the two connecting portions 602 of the handle 6 is provided with the long strip hole 8, each of positions of the head 2 connected with the two connecting portions 602 is provided with the hinged shaft 7, and the limiting groove 9 is provided around each hinged shaft 7. One end of the hinged shaft 7 is connected with the head 2, and the other end is in sliding fit with the long strip hole 8. When the handle 6 is required to support the head 2, the handle 6 is pushed upwards, the hinged shaft 7 is moved to the locking position (the hinged shaft 7 is located at a bottom end of the long strip hole 8), the connecting portion 602 of the handle 6 is limited in the limiting groove 9, and the handle 6 cannot shake at the point, such that the head 2 can be stably supported; when the handle 6 is required to be rotated freely, the handle 6 is pulled downwards, the hinged shaft 7 is moved to the unlocking position (the hinged shaft 7 is located at a position other than the bottom end of the long strip hole 8), the connecting portion 602 of the handle 6 is separated from the limiting groove 9, and the handle 6 can be rotated freely at the point. In the present embodiment, the handle is fixed by the limiting groove, thus preventing the handle from shaking left and right.

Figure 9:
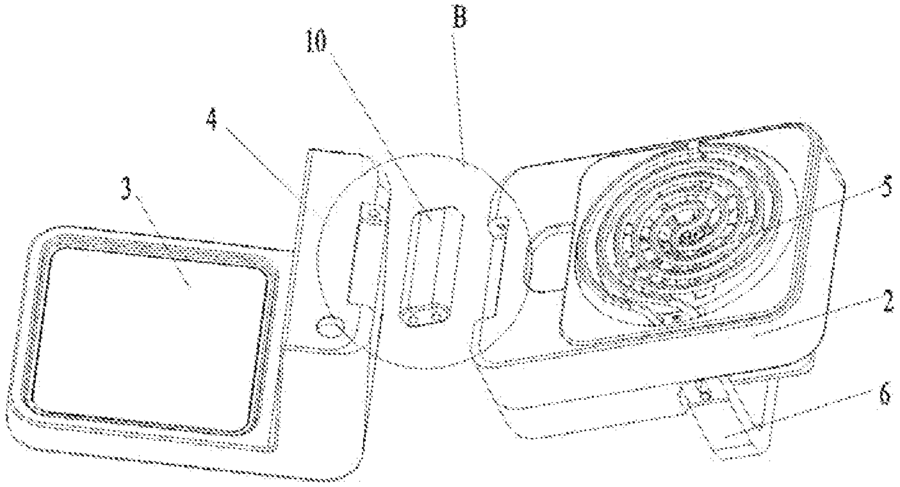
FIG. 9 is a schematic diagram of the embodiment of the present application in which the head and a side plate are hinged.
Figure 10:
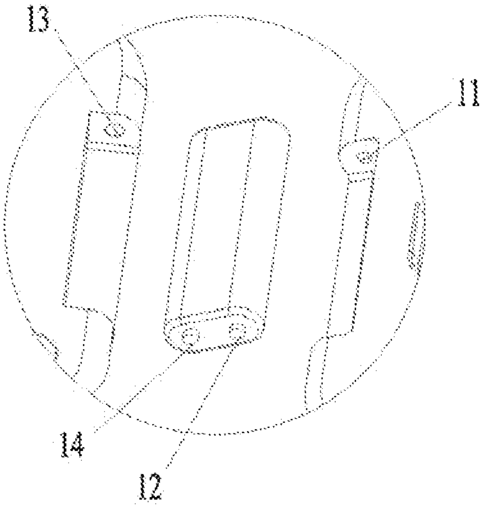
FIG. 10 is a partial enlarged view at B in FIG. 9.

In an optional embodiment, referring to FIGS. 9 to 10, a hinged seat 10 is provided between the head 2 and the side plate 4, a first mounting hole 11 is provided in one of the head 2 and the hinged seat 10, a corresponding first pin shaft 12 is provided in the other of the head 2 and the hinged seat 4, a second mounting hole 13 is provided in one of the side plate 4 and the hinged seat 10, a corresponding second pin shaft 14 is provided in the other of the side plate 4 and the hinged seat 10, the first pin shaft 12 is fitted with the first mounting hole 11, and the second pin shaft 14 is fitted with the second mounting hole 13, so as to hinge the head 2 to the side plate 4. Specifically, a first mounting groove is provided in a position on the head 2 in contact with the side plate 4, a second mounting groove is provided in a position on the side plate 4 in contact with the head 2, and sizes of the first mounting groove and the second mounting groove are matched with the hinged seat 10. The first mounting hole 11 is provided in the first mounting groove, the second mounting hole 13 is provided in the second mounting groove, the corresponding first pin shaft 12 and second pin shaft 14 are provided in the hinged seat 10, the first pin shaft 12 is inserted into the first mounting hole 11, and the second pin shaft 14 is inserted into the second mounting hole 13. In practical applications, positions of the first pin shaft 12 and the first mounting hole 11 and positions of the second pin shaft 14 and the second mounting hole 13 can be exchanged according to the structure of the air fryer. When the head 2 is rotated to the first position, the bottom of the head 2 is attached to a top of the side plate 4, and one end of the hinged seat 10 is embedded into the first mounting groove and the other end is embedded into a second groove 17. When the head 2 is rotated to the second position, a side surface of the head 2 is attached to a side surface of the side plate 4, and one end of the hinged seat 10 is embedded into the first mounting groove and the other end is embedded into the second groove 17. In the present embodiment, the arrangement of a double-shaft hinged structure may reduce a rotating speed of the head 2, avoid impact of the head 2 in the rotating process on the whole machine and a structure at a hinged position, and guarantee stability and use reliability of the whole machine. Meanwhile, when the head 2 is rotated to the second position, the double-shaft hinged structure can also assist in supporting the head 2 to improve stability of the head 2.

In an optional embodiment, referring to FIGS. 1 to 4, a heating element 15 is mounted in the base 3, wherein the heating element 15 includes one of a coil disk, a heating pipe and a heating disk, and the heating element 15 is provided corresponding to the bottom of the cookware 1. During cooking, when the head 2 is rotated to the first position, the air frying module 5 can be used alone to fry food, or the air frying module 5 and the heating element 15 can be used simultaneously to fry food, or the heating element 15 can be used alone to steam, stew, fry and roast food; when the head 2 is rotated to the second position, the heating element 15 may be used to steam food, and meanwhile, the heating tube 503 in the air frying module 5 may be used to roast food; that is, different kinds of food may be cooked simultaneously. In the present embodiment, working modes of the air fryer are further expanded by providing the heating element 15, thus improving a cooking efficiency of the air fryer.

Figure 11:
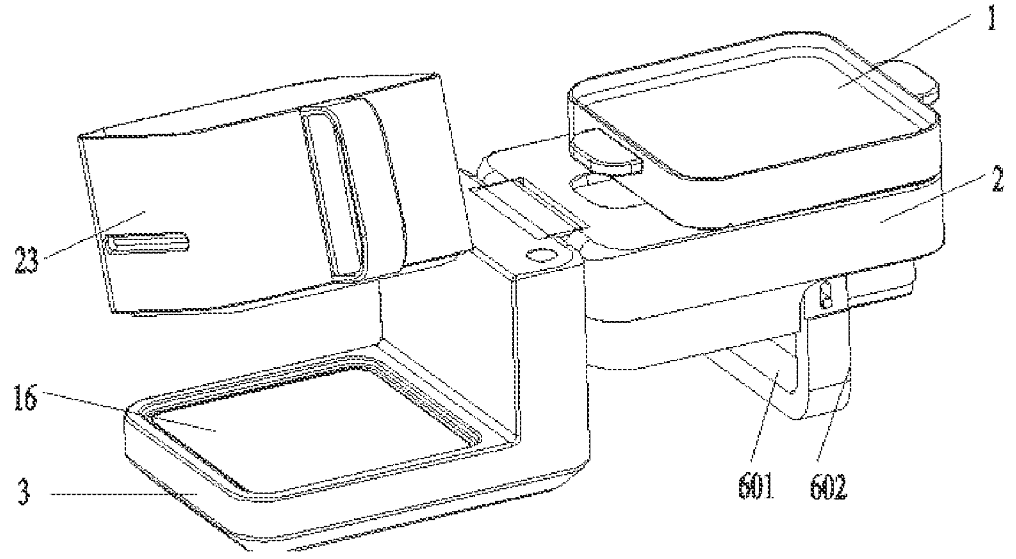
FIG. 11 is a schematic diagram of the embodiment of the present application in which a cookware is placed on a base.

In an optional embodiment, referring to FIG. 11, a first groove 16 is provided in the base 3, and at least part of the cookware 1 is limited in the first groove 16. In the present embodiment, the arrangement of the first groove 16 can avoid shaking or shifting of the cookware 1 when placed on the base 3.

Figure 12:
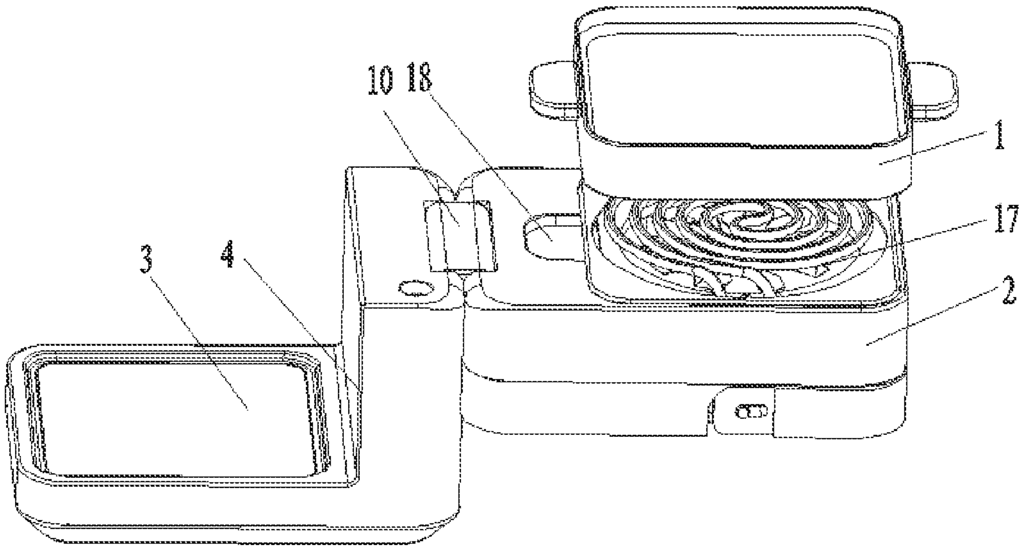
FIG. 12 is a schematic diagram of the embodiment of the present application in which the cookware is placed at an opening of the head.

In an optional embodiment, referring to FIG. 12, the head 2 is provided with the second groove 17, and when the head 2 is rotated to the second state, at least part of the cookware 1 is limited in the second groove 17. In the present embodiment, the arrangement of the second groove 17 can avoid shaking or shifting of the cookware 1 when placed on the opening of the head 2.

In order to improve the cooking efficiency, when the cookware 1 is placed in the second groove 17, in general, most region of the cookware 1 is limited in the second groove 17, such that the cookware 1 is as close to the heating tube 503 as possible, and at this point, a periphery of the cookware 1 or a handle portion of the cookware 1 is closer to the heating tube 503, and therefore, a user may be scalded when taking and placing the cookware 1. In this connection, in the present embodiment, a third groove 18 is provided in a periphery of the second groove 17, a safety region is formed between the third groove 18 and the cookware 1, and when the user takes and places the cookware 1, the user operates in the safety region, and the heating tube 503 of the air frying module 5 would not scald the user, thus improving safety in a using process. Exemplarily, the third groove 17 is provided in the air duct plate 505 by inwards recessing a part of the air duct plate 505.

In an optional embodiment, referring to FIGS. 1 to 4, a junction box 19 is provided on a side surface of the side plate 4. In the present embodiment, the arrangement of the junction box 19 facilitates accommodation of a power line, thus preventing the power line from being lost or damaged, and also improving the aesthetics of the air fryer.

Figure 13:
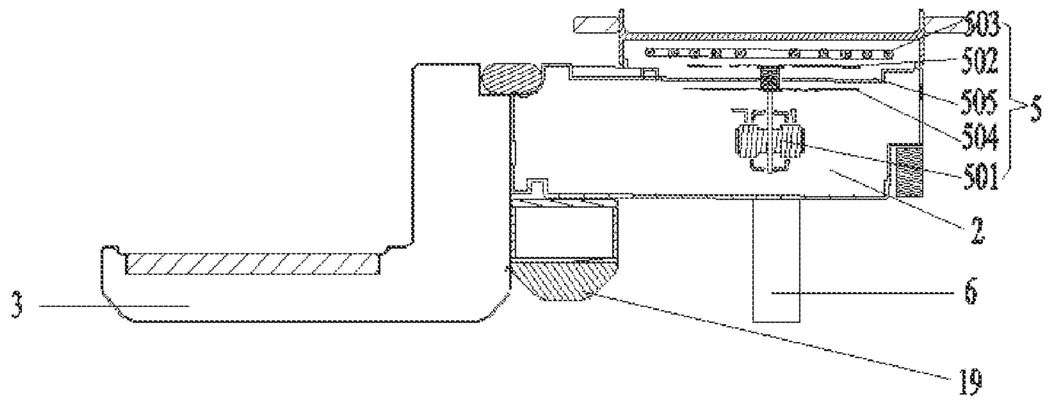
FIG. 13 is a sectional view of the embodiment of the present application in which the head is rotated to the second position and a junction box is slid to a third position.

In an optional embodiment, referring to FIG. 13, the junction box 19 has a support portion, and when the head 2 is rotated to the second position, the support portion supports the head 2; and/or the junction box 19 is slidably connected with the side surface of the side plate 4, when the head 2 is rotated to the second position, the junction box 19 slides to the third position, and the junction box 19 supports the head 2. Exemplarily, a top of the junction box 19 has an arc-shaped surface, and a shape of the arc-shaped surface matches a movement track of the head 2 during rotation. In the rotation process of the head 2, a part of the head 2 slides along the arc-shaped surface; when the head 2 is rotated to the second position, an end portion of the arc-shaped surface supports the head 2. It should be noted that the specific arrangement of the arc-shaped surface depends on the rotation track of the head 2, and the arc-shaped surface can support the head 2 without restricting the rotation of the head 2. Exemplarily, the side surface of the side plate 4 is provided with a sliding rail, the junction box 19 can slide along the sliding rail, and when the head 2 is rotated to the first position, the junction box 19 is located at a lowest point in the sliding rail, and the junction box 19 does not affect the rotation of the head 2; when the head 2 is rotated to the second position, the junction box 19 slides upwards to a third position (at a highest point in the sliding rail), and the junction box 19 is attached to a surface of the head 2 to support the head. In the present application, by providing the support portion or sliding the junction box 19 to the third position and attaching it to the head 2, the junction box 19 assists in supporting the head 2, so as to avoid a force at a position where the head 2 and the side plate 4 are hinged and effects on the service life of the air fryer.

Figure 14:
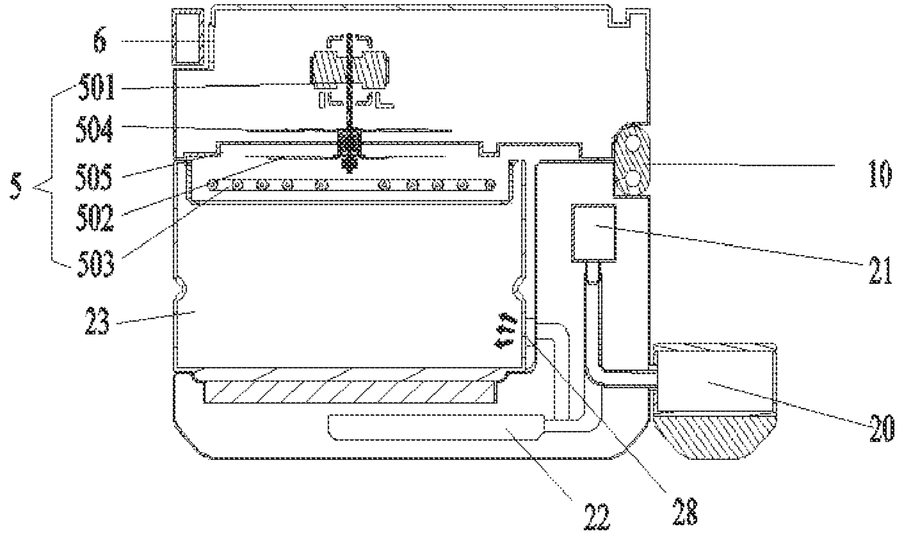
FIG. 14 is a schematic structural diagram of a flip-type multifunctional air fryer with steaming and stewing functions according to an embodiment of the present application.

In an optional embodiment, referring to FIG. 14, the air fryer further includes: a water tank 20, a water pump 21 and a steam generator 22; the steam generator 22 has a water inlet and a steam outlet, the water inlet of the steam generator 22 is communicated with the water pump 21, and the steam outlet of the steam generator 22 is communicated with an interior of the basket 23. Specifically, the water tank 20 may be provided on the side surface of the side plate 4, or may be provided inside the side plate 4, and in practical applications, in order to facilitate water filling of the water tank 20, the water tank 20 is typically provided on the side surface of the side plate 4. At this point, the water pump 21 can be provided inside the side plate 4, the steam generator 22 is provided in the base 3, and steam generated by the steam generator 23 is delivered into the basket 23 to tenderly steam the food inside the basket 23. To facilitate the delivery of the steam, a steam nozzle 28 is usually mounted on a side wall of the side plate 4, and the steam nozzle 28 penetrates through a side wall of the basket 23 into the basket 23. The basket 23 is provided therein with a frying plate, and a steam jet of the steam nozzle 5 is located below the frying plate. During cooking, water in the water tank 20 is pumped into the steam generator 22 by the water pump 21, the water in the steam generator 22 is heated by the heating element 15 to form hot steam, and the hot steam is directly input into the basket 23 through the steam nozzle; since the steam nozzle 28 is located below the frying plate, and food is placed on upper side of the frying plate, the incoming hot steam can directly act on the food to steam and stew the food, and no waste of the steam is caused. In the present application, by providing the water tank 20, the water pump 21 and the steam generator 22, the air fryer has steaming and stewing functions, and steaming and roasting may be combined in a cooking process, thus improving a taste of food.

Figure 15:
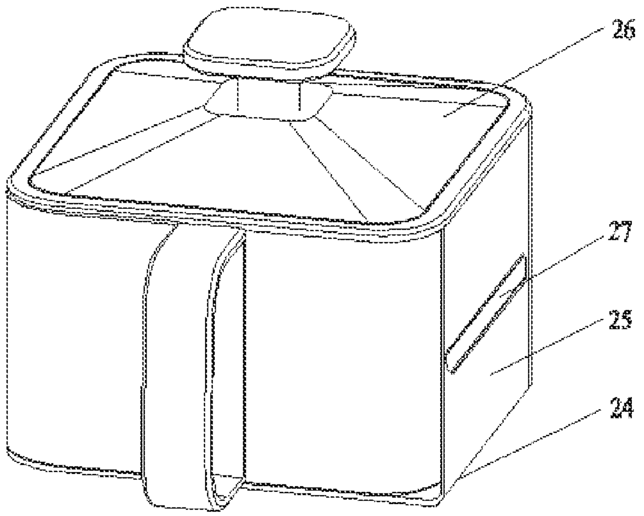
FIG. 15 is a schematic structural diagram of a basket according to the embodiment of the present application.

In an optional embodiment, referring to FIG. 15, the basket 23 includes a base plate 24 and a vertical plate 25 provided around the base plate 24, the base plate 24 and the vertical plate 25 are integrally shaped to form an accommodating cavity, and when the basket 23 is placed on the base 3, part region of the vertical plate 25 is surrounded by the side plate 4, and the rest region of the vertical plate 25 is directly exposed. In the present embodiment, the vertical plate 25 is directly exposed, heat of the basket 25 is dissipated using an external environment, since a cold-air outer circulation structure, such as a lower core, a door plate, or the like, is not required to be provided, a structure of the basket is simplified and the manufacturing cost of the air fryer is reduced.

In an optional embodiment, referring to FIG. 14, the basket 23 further includes a cover 26 on the vertical plate 25 for covering, an inner wall of the vertical plate 25 is provided with a step surface 27, and the frying plate and a steaming plate are selectively mounted on the step surface 27. Specifically, both the frying plate and the steaming plate can be mounted on the step surface 27, and when the food is required to be fried, the frying plate is placed on the step surface 27, the air frying module 5 is used for frying the food, wherein when the food is required to be steamed, the steaming plate is placed on the step surface 27, the cover 26 covers the vertical plate 25, and the heating tube 503 or the heating element 15 of the air frying module 5 is used for steaming the food. In the present embodiment, the basket can both fry and steam food, and it is realized that using one basket to achieve multiple functions, thus having good practicality.

In an optional embodiment, a detachable protective net is provided in the head 2, and the protective net is located below the air frying module 5. In the present embodiment, when the head 2 is rotated to the first position, the arrangement of the protective net can prevent oil fume from entering the interior of head 2 to pollute the heating tube 503, the heat circulation fan 502, or the like; when the head 2 is rotated to the second position, the arrangement of the protective net can prevent the cookware 1 from being in direct contact with the heating tube 503 to damage a coating of the cookware 1 or generate a scratch.

It is to be noted that terms used herein only aim to describe specific embodiments, and are not intended to limit the exemplary embodiments of this application. As used herein, singular forms of terms are intended to include plural forms unless otherwise directed by the context Besides, it will be also appreciated that when terms “contain” and/or “include” are used in the description, it is indicated that features, steps, operations, devices, assemblies and/or a combination thereof exist.

Unless otherwise specified, relative arrangements of components and steps, numeric expressions and numeric values elaborated in these embodiments do not limit the scope of the present application. Furthermore, it should be understood that for ease of descriptions, the size of each part shown in the drawings is not drawn in accordance with an actual proportional relation. Technologies, methods and apparatuses known by those skilled in the related art may not be discussed in detail. However, where appropriate, the technologies, methods and apparatuses shall be regarded as part of the authorized description. In all examples shown and discussed herein, any specific values shall be interpreted as only exemplary values instead of limited values. As a result, other examples of the exemplary embodiments may have different values. It is to be noted that similar reference numbers and letters represent similar items in the following drawings. As a result, once a certain item is defined in one drawing, it is unnecessary to be further discussed in the subsequent drawings.

In the descriptions of the present application, it will be appreciated that orientation or position relations indicated by orientation words, such as “front, back, up, down, left, and right”, “horizontal, vertical, perpendicular, and horizontal”, “top and bottom” and other terms, are orientation or position relations shown on the basis of the drawings, which are only intended to make it convenient to describe the present application and simplify the descriptions, and without any explanation to the contrary, these orientation words do not indicate or impliedly indicate that the referring device or element must have a specific location or must be constructed and operated with the specific location, and accordingly it cannot be understood as limitations to the present application. The orientation words “inner and outer” refer to the inner and outer contours of each component itself.

For ease of description, spatial relative terms such as “over”, “above”, “on an upper surface of” and “upper” may be used herein for describing a spatial position relation between a device or feature and another device or feature shown in the drawings. It will be appreciated that the spatial relative terms aim to contain different orientations in usage or operation besides the orientations of the devices described in the drawings. For example, if the devices in the drawings are inverted, devices described as “above other devices or structures” or “over other devices or structures” then will be located as “below other devices or structures” or “under other devices or structures”. Thus, an exemplary term “above” may include two orientations namely “above” and “below”. The device may also be located in other different modes (rotated by 90 degrees or located in other orientations), and spatial relative descriptions used herein are correspondingly explained.

In addition, it should be noted that when those terms such as “first” and “second” are used to limit parts, they are only used to facilitate for distinguishing the corresponding parts. Unless otherwise stated, the above terms do not have special meanings, and therefore it cannot be interpreted as limitation to the scope of protection of the present application.

The above is a detailed introduction to the flip-type multifunctional air fryer according to the present application, and the specific examples herein are utilized to illustrate the principles and embodiments of the application. The above description of the embodiments is merely to assist in understanding the method and ideas of the present application. However, persons skilled in the art could, based on the ideas in the application, make alterations to the specific embodiments and application scope, and thus the content of the present description should not be construed as limitation on the present application.

What is claimed is:

1. A flip-type multifunctional air fryer, comprising a cookware, a head, a base and a side plate which is provided between the head and the base, wherein a bottom of the head is configured as an open structure, an air frying module is mounted in the head, and the cookware at least comprises a basket, wherein the head is rotatably connected with the side plate, and the head at least has following two positions in a rotation process:

a first position where a bottom opening of the head faces downwards and is communicated with a top opening of the basket; and a second position where the bottom opening of the head faces upwards and is connected with a bottom of the cookware;

a handle is provided on the head, wherein when the head is rotated to the second position, the handle supports the head; and the handle is hinged to the head, wherein when the head is rotated to the first position, the handle is accommodated on a surface of the head; and when the head is rotated to the second position, the handle supports the head.

2. The flip-type multifunctional air fryer according to claim 1, wherein the head is provided with a hinged shaft and a limiting groove, the handle is provided with an elongated strip hole, the hinged shaft is slidably fitted with the elongated strip hole, the hinged shaft can be at a locking position and an unlocking position in the elongated strip hole, wherein when the handle supports the head, the hinged shaft is located at the locking position, and the handle is limited in the limiting groove.

3. The flip-type multifunctional air fryer according to claim 1, wherein a hinged seat is provided between the head and the side plate, a first mounting hole is provided in one of the head and the hinged seat, and a corresponding first pin shaft is provided in the other of the head and the hinged seat; a second mounting hole is provided in one of the side plate and the hinged seat, and a corresponding second pin shaft is provided in the other of the side plate and the hinged seat, wherein the first pin shaft is fitted with the first mounting hole, and the second pin shaft is fitted with the second mounting hole, so as to hinge the head to the side plate.

4. The flip-type multifunctional air fryer according to claim 1, wherein a heating element is mounted in the base, the heating element comprises one of a coil disk, a heating pipe and a heating disk, and the heating element is provided correspondingly to the bottom of the cookware.

5. The flip-type multifunctional air fryer according to claim 4, wherein a first groove is provided in the base, and at least part of the cookware is limited in the first groove.

6. The flip-type multifunctional air fryer according to claim 4, wherein the head is provided with a second groove, wherein when the head is rotated to the second position, at least part of the cookware is limited in the second groove.

7. The flip-type multifunctional air fryer according to claim 6, wherein a third groove is provided in a periphery of the second groove, wherein when at least part of the cookware is limited in the second groove, a safety region is formed between the third groove and the cookware, so as to prevent the air frying module from scalding a user.

8. The flip-type multifunctional air fryer according to claim 1, wherein a junction box is provided on a side surface of the side plate.

9. The flip-type multifunctional air fryer according to claim 8, wherein the junction box has a support portion, wherein when the head is rotated to the second position, the support portion supports the head; and/or the junction box is slidably connected with the side surface of the side plate, and when the head is rotated to the second position, the junction box slides to a third position and the junction box supports the head.

10. The flip-type multifunctional air fryer according to claim 1, further comprising:

a water tank;

a water pump communicated with the water tank;

a steam generator with a water inlet and a steam outlet, wherein the water inlet of the steam generator is communicated with the water pump, and the steam outlet of the steam generator is communicated with an interior of the basket.

11. The flip-type multifunctional air fryer according to claim 1, wherein the basket comprises a base plate and a vertical plate provided around the base plate, the base plate and the vertical plate are integrally formed as an accommodating cavity, wherein when the basket is placed on the base, a partial region of the vertical plate is surrounded by the side plate, and a rest region of the partial region of the vertical plate is directly exposed.

12. The flip-type multifunctional air fryer according to claim 11, wherein the basket further comprises a cover covering the vertical plate, an inner wall of the vertical plate is provided with a step surface, and a frying plate and a steaming plate are selectively mounted on the step surface.

13. The flip-type multifunctional air fryer according to claim 1, wherein a detachable protective net is provided in the head, and the protective net is located below the air frying module.

14. The flip-type multifunctional air fryer according to claim 1, wherein a heating element is mounted in the base, the heating element comprises one of a coil disk, a heating pipe and a heating disk, and the heating element is provided correspondingly to the bottom of the cookware.

15. The flip-type multifunctional air fryer according to claim 1, wherein a heating element is mounted in the base, the heating element comprises one of a coil disk, a heating pipe and a heating disk, and the heating element is provided correspondingly to the bottom of the cookware.

16. The flip-type multifunctional air fryer according to claim 2, wherein a heating element is mounted in the base, the heating element comprises one of a coil disk, a heating pipe and a heating disk, and the heating element is provided correspondingly to the bottom of the cookware.

17. The flip-type multifunctional air fryer according to claim 3, wherein a heating element is mounted in the base, the heating element comprises one of a coil disk, a heating pipe and a heating disk, and the heating element is provided correspondingly to the bottom of the cookware.

18. The flip-type multifunctional air fryer according to claim 1, further comprising:

a water tank;

a water pump communicated with the water tank;

a steam generator with a water inlet and a steam outlet, wherein the water inlet of the steam generator is communicated with the water pump, and the steam outlet of the steam generator is communicated with an interior of the basket.

* * * * *